US010882666B2

(12) United States Patent
Giraud et al.

(10) Patent No.: US 10,882,666 B2
(45) Date of Patent: Jan. 5, 2021

(54) PROCESSES FOR MAKING AND USING CLOSURES HAVING CONTAINER ORIFICE REDUCER WITH TAMPER EVIDENT SEAL

(71) Applicant: CSP TECHNOLOGIES, INC., Auburn, AL (US)

(72) Inventors: Jean-Pierre Giraud, Auburn, AL (US); Franklin Lee Lucas, Jr., Auburn, AL (US)

(73) Assignee: CSP TECHNOLOGIES, INC., Auburn, AL (US)

( * ) Notice: Subject to any disclaimer, the term of this patent is extended or adjusted under 35 U.S.C. 154(b) by 0 days.

(21) Appl. No.: 16/780,723

(22) Filed: Feb. 3, 2020

(65) Prior Publication Data

US 2020/0172299 A1   Jun. 4, 2020

Related U.S. Application Data

(63) Continuation of application No. 15/239,324, filed on Aug. 17, 2016, now Pat. No. 10,549,889.

(Continued)

(51) Int. Cl.
*B65D 77/20* (2006.01)
*B65D 51/20* (2006.01)
(Continued)

(52) U.S. Cl.
CPC .......... *B65D 41/3495* (2013.01); *B29C 39/00* (2013.01); *B32B 3/02* (2013.01);
(Continued)

(58) Field of Classification Search
CPC .... B65D 47/12; B65D 47/36; B65D 2231/02; B65D 2231/025; B65D 2231/027; B65D 41/62; B65D 83/06; B65D 2577/2091; B65D 2577/2033; B65D 2577/209; B65D 2577/20; B65D 2577/2075;
(Continued)

(56) References Cited

U.S. PATENT DOCUMENTS 3,622,041 A   11/1971 Borsum et al.
3,746,154 A   7/1973 Gach
(Continued)

FOREIGN PATENT DOCUMENTS

CN      1878703 A     12/2006
CN    101652293 A      2/2010
(Continued)

OTHER PUBLICATIONS

International Search Report for International Application No. PCT/US2016/047237, dated Nov. 16, 2016.
(Continued)

*Primary Examiner* — Allan D Stevens
(74) *Attorney, Agent, or Firm* — David B. Gornish; Eckert Seamans Cherin & Mellott, LLC

(57) ABSTRACT

Containers with closures are disclosed. A closure may include at least a polymer orifice reducer configured to be permanently secured to a rim of an opening of a container and a flexible tamper evident seal disposed on the topside of the orifice reducer. The flexible tamper evident seal, optionally foil, covers one or more openings in the orifice reducer. Processes for permanently securing a closure to a container, optionally by forming a heat seal between the orifice reducer and container rim, are also disclosed.

22 Claims, 7 Drawing Sheets

Related U.S. Application Data

(60) Provisional application No. 62/205,979, filed on Aug. 17, 2015, provisional application No. 62/326,078, filed on Apr. 22, 2016.

(51) Int. Cl.

| | | |
|---|---|---|
| *B29C 65/14* | (2006.01) | |
| *B65D 41/34* | (2006.01) | |
| *B32B 3/26* | (2006.01) | |
| *B65D 55/02* | (2006.01) | |
| *B32B 15/08* | (2006.01) | |
| *B65D 47/00* | (2006.01) | |
| *B65D 41/04* | (2006.01) | |
| *B65D 53/04* | (2006.01) | |
| *B32B 27/32* | (2006.01) | |
| *B32B 3/02* | (2006.01) | |
| *B32B 27/18* | (2006.01) | |
| *B32B 27/08* | (2006.01) | |
| *B32B 7/12* | (2006.01) | |
| *B29C 39/00* | (2006.01) | |
| *B65D 41/50* | (2006.01) | |

(52) U.S. Cl.
CPC .............. *B32B 3/266* (2013.01); *B32B 7/12* (2013.01); *B32B 15/08* (2013.01); *B32B 27/08* (2013.01); *B32B 27/18* (2013.01); *B32B 27/32* (2013.01); *B65D 41/045* (2013.01); *B65D 41/50* (2013.01); *B65D 47/00* (2013.01); *B65D 51/20* (2013.01); *B65D 53/04* (2013.01); *B65D 55/022* (2013.01); *B32B 2250/05* (2013.01); *B32B 2250/44* (2013.01); *B32B 2255/10* (2013.01); *B32B 2255/24* (2013.01); *B32B 2264/10* (2013.01); *B32B 2307/31* (2013.01); *B32B 2307/546* (2013.01); *B32B 2435/02* (2013.01); *B32B 2439/70* (2013.01); *B65D 2231/025* (2013.01); *B65D 2251/0015* (2013.01); *B65D 2251/0087* (2013.01); *B65D 2251/0093* (2013.01)

(58) Field of Classification Search
CPC .............. B65D 77/2032; B65D 77/206; B65D 77/2024; B65D 77/2028; B65D 77/20; B65D 51/185; B65D 51/20; B65D 51/22; B65D 51/18; B65D 53/08; B65D 53/04; B65D 2251/0071; B65D 2251/0087; B65D 2251/0093; B65D 2251/0096; B65D 2251/004; B65D 2251/0062; B65D 2251/0065; B65D 2251/0015; B65D 2251/0018; B65D 50/043; B65D 50/045
USPC ..... 220/257.1, 359.3, 359.4, 257.2; 215/232, 215/250, 310; 206/540
See application file for complete search history.

(56) References Cited

U.S. PATENT DOCUMENTS

| | | |
|---|---|---|
| 3,874,564 A | 4/1975 | Huneke |
| 4,013,188 A | 3/1977 | Ray |
| 4,579,245 A | 4/1986 | Narushko |
| 5,911,937 A | 6/1999 | Hekal |
| 6,070,759 A | 6/2000 | Bridge et al. |
| 6,080,350 A | 6/2000 | Hekal |
| 6,124,006 A | 9/2000 | Hekal |
| 6,130,263 A | 10/2000 | Hekal |
| 6,174,952 B1 | 1/2001 | Hekal et al. |
| 6,214,255 B1 | 4/2001 | Hekal |
| 6,221,446 B1 | 4/2001 | Hekal |
| 6,422,411 B1 | 7/2002 | Gray |
| 7,740,730 B2 | 6/2010 | Schedl et al. |
| 7,780,008 B2 | 8/2010 | Portier |
| 8,746,484 B2 | 6/2014 | Thorstensen-Woll et al. |
| 8,991,608 B2 | 3/2015 | Zuser et al. |
| 9,132,947 B2 | 9/2015 | Wiening |
| 2006/0081633 A1 | 4/2006 | Schmidtner et al. |
| 2006/0289542 A1 | 12/2006 | Schedl et al. |
| 2007/0210027 A1 | 9/2007 | Abbott |
| 2008/0135568 A1 | 6/2008 | Giraud et al. |
| 2008/0308518 A1 | 12/2008 | Sprishen |
| 2009/0277859 A1 | 11/2009 | Von Spreckelsen et al. |
| 2009/0311475 A1 | 12/2009 | Kornfeld et al. |
| 2010/0059473 A1 | 3/2010 | Kitamura et al. |
| 2010/0059516 A1 | 3/2010 | Parker et al. |
| 2010/0126992 A1 | 5/2010 | Phillips |
| 2011/0253715 A1 | 10/2011 | Phaneuf et al. |
| 2011/0290815 A1 | 12/2011 | Weld |
| 2012/0111883 A1 | 5/2012 | Kim |
| 2016/0046422 A1 | 2/2016 | Grell |

FOREIGN PATENT DOCUMENTS

| | | |
|---|---|---|
| CN | 101723142 A | 6/2010 |
| CN | 102939248 A | 2/2013 |
| CN | 105531192 A | 4/2016 |
| DE | 102010054494 B3 | 10/2011 |
| EP | 2130781 A1 | 12/2009 |
| GB | 1549018 A | 8/1979 |
| JP | 11-11526 A | 1/1999 |
| JP | 2000-70333 A | 3/2000 |
| JP | 2005-218862 A | 8/2005 |
| JP | 2008-2392020 A | 10/2008 |
| JP | 2009154939 A | 7/2009 |
| JP | 2014069873 A | 4/2014 |
| SE | 7607738 A | 1/1977 |
| WO | 2002081322 A1 | 10/2002 |
| WO | 2012079971 A1 | 6/2012 |
| WO | 2014007485 A1 | 1/2014 |
| WO | 2015009658 A2 | 1/2015 |

OTHER PUBLICATIONS

Chinese Office Action for CN Application No. 2016800575896, dated Mar. 18, 2019. (English language Translation).

PROCESSES FOR MAKING AND USING CLOSURES HAVING CONTAINER ORIFICE REDUCER WITH TAMPER EVIDENT SEAL

CROSS-REFERENCE TO RELATED APPLICATIONS

This Application is a continuation application of U.S. application Ser. No. 15/239,324, filed Aug. 17, 2016, which claims priority to U.S. Provisional Application Nos. 62/205,979, filed Aug. 17, 2015 and 62/326,078, filed Apr. 22, 2016, all of which are incorporated by reference herein in their entireties for all purposes.

BACKGROUND OF THE INVENTION

1. Field of Invention

This invention relates to containers having a flexible seal (e.g., foil) for product-preservation and tamper evidence as well as an orifice reducer for product dispensing. The invention may be used for many different applications and industries, including, e.g., pharmaceuticals and nutraceuticals (e.g., tablets, capsules and liquids), foods (e.g., spice bottles) and chemical dispensing (e.g., pool or cleaning chemicals). Product forms contemplated include, among others, liquids, tablets, capsules, pellets, powders, granules and other small solid units.

2. Description of Related Art

Commercial medicine containers, e.g., for tablets and capsules, are typically provided as plastic bottles with removable caps (often having some type of child-resistance configuration). For example, over the counter (OTC) pain relief tablets, allergy medications, as well as nutraceuticals and vitamins, are often provided in such bottles. Typically, to ensure a purchaser that the contents of the bottle has not been tampered with, a flexible seal (typically composed of foil, paper, flexible/thin plastic, cardboard or a composite of one or more of the foregoing), provides a hermetic, air tight seal to the container opening. The first time a user desires access to the contents of the container, the user may permanently puncture the seal or remove it at least in part. An intact seal protects the contents of the container from the ambient environment and provides users with a visual indicator that the container has not been tampered with.

Depending on the nature of the container contents, a desiccant or other active material may be needed to control the environment inside the container. Typically, a desiccant is provided in the form of a desiccant containing sachet or cylindrical canister, which loosely sits within the body of the container, along with the container's contents.

Containers (e.g., bottles) as described above are typically filled via automated processing. Tamper proof seals (e.g., foil) are then applied thereto post-filling. Various methods and means for securing a seal are known, e.g., via adhesives or heat. The most common method for applying the seal is via induction sealing. Induction sealing is a process that relies on electrical currents within a material, e.g., foil, to produce heat. Induction sealing requires a source of electrical energy, an induction coil and an electrically conductive target material (the material to be heated, typically the foil seal itself). As electricity passes through the induction coil, an electromagnetic field is generated around the coil. When the target material (e.g., foil seal) is exposed to the electromagnetic field, eddy currents are created in the target material, causing the target material to heat up because of resistance losses. The heat from the target material is transferred to adjacent plastic material (e.g., the plastic rim of the bottle opening), causing the plastic to soften and fuse to the foil. The plastic material (rim of the bottle opening) combined with the target material (foil) form a heat seal upon cooling.

One disadvantage of standard bottles is that once the tamper-proof seal is removed, the opening is typically very large (e.g., an inch, give or take) such that tilting the bottle to remove a single tablet/capsule often results in several tablets/capsules falling out at once. A similar problem can occur with such bottles having liquid or powder contents, where too much of the liquid or powder may pour out at once. Alternatively, a user may reach a finger into the bottle to retrieve a single tablet/capsule, thereby contaminating the contents of the bottle. Thus, the industry has an interest in dispensing means that facilitate removal of a single tablet/capsule or only a small number of the same (or small amounts of liquid/powder), at a time.

While various dispensing means have been previously proposed, they often involve complicated and expensive to manufacture moving parts (e.g., springs, actuators and the like) and/or present manufacturing challenges, particularly when it is desired to apply both a tamper-proof seal and dispensing means to a filled bottle. For example, in the food industry, spice containers typically include orifice reducers that are separately constructed and press-fit onto a bottle rim after the foil seal has been induction sealed to the rim. This configuration requires the user to temporary remove the orifice reducer, peel away or puncture the seal, and then re-attach the orifice reducer to the bottle in order to use the product with a meter dosage option.

For example, one challenge in achieving the desired objective relates to the manner in which the bottles are made and filled. An option in providing a structure that facilitates unitary tablet/capsule dispensing or dispensing in small numbers, is to include an orifice reducer in the mouth or opening of the container. An orifice reducer is a structure that blocks some, but not all, of an opening to a container. Where a container is to be prefilled, it is generally not practical or possible to have the orifice reducer in place prior to filling, since the orifice reducer obstructs some or much of the container opening.

There is thus a need for a bottle or container generally having a simple to manufacture tablet/capsule dispensing function with a tamper-proof seal.

SUMMARY OF THE INVENTION

Accordingly, in one aspect, the invention is directed to a closure for a container. The container has a rim surrounding an opening of the container, the rim having a continuous annular upper engagement surface extending from the opening to an outer periphery of the rim. The closure includes a polymer orifice reducer. The orifice reducer is configured to be disposed over the rim of the container. The orifice reducer has an underside, a topside and at least one pre-formed dispensing opening providing passage from the underside to the topside. In an optional embodiment, the orifice reducer may have two or more pre-formed dispensing openings, including a plurality of three or more such openings. The underside includes a downwardly facing annular engagement surface configured to be disposed over the upper engagement surface of the rim and permanently secured to it. A flexible, tamper evident seal is disposed over at least part of the topside of the orifice reducer, the seal including a first seal section and a second seal section. The first seal section is over at least some area of the topside of the orifice reducer directly above the downwardly facing engagement surface. The second seal section covers the at least one dispensing opening, wherein the seal is more flexible than the orifice reducer, the second seal section being configured to be removed at least in part from the at least one dispensing opening and/or punctured through to provide access to the at least one dispensing opening. The first seal section is configured to cause the engagement surface of the orifice reducer to be permanently secured to the upper engagement surface of the rim of the container.

In another aspect, the invention is directed to a container. The container includes a body having a base and one or more sidewalls extending from the base leading to a rim surrounding an opening of the container. The rim has a continuous annular upper engagement surface extending from the opening to an outer periphery of the rim. The container further includes a closure. The closure includes a polymer orifice reducer, the orifice reducer being disposed over the rim of the container. The orifice reducer has an underside, a topside and at least one dispensing opening providing passage from the underside to the topside. The underside includes a downwardly facing annular engagement surface disposed over the entire upper engagement surface of the rim and permanently secured to it. The closure further includes a flexible, tamper evident seal disposed over at least a portion of the topside of the orifice reducer and covering the at least one dispensing opening, wherein the seal is more flexible than the orifice reducer, the seal being configured to be removed at least in part from the at least one dispensing opening and/or punctured through to provide access to the at least one dispensing opening.

In another aspect, the invention is directed to a closure for a container. The closure includes a cap having a top portion with an annular skirt depending downward from the top portion and terminating at an annular boundary. The cap defines an interior space within the skirt of the cap. The closure further includes a polymer orifice reducer. The orifice reducer is configured to be disposed over a rim and opening of a container. The orifice reducer has an underside, a topside and at least one dispensing opening providing passage from the underside to the topside. The underside includes a downwardly facing annular engagement surface configured to be disposed over an upper engagement surface of the rim and permanently secured to it. The orifice reducer is disposed within the interior space of the cap with the topside of the orifice reducer facing the top portion of the cap. No part of the orifice reducer extends beyond the annular boundary of the cap. The closure further includes a flexible, tamper evident seal disposed over at least part of the topside of the orifice reducer, the seal including a first seal section and a second seal section. The first seal section is disposed over at least some area of the topside of the orifice reducer directly above the downwardly facing engagement surface, the second seal section covering the at least one dispensing opening, wherein the seal is more flexible than the orifice reducer, the second seal section being configured to be removed at least in part from the at least one dispensing opening and/or punctured through to provide access to the at least one dispensing opening, the first seal section comprising a material configured to be heated during an induction sealing process so as to cause the engagement surface of the orifice reducer to melt and then harden, to configure the engagement surface of the orifice reducer to permanently adhere to the upper engagement surface of the rim of the container.

Optionally, an injection molded polymer orifice reducer according to the invention may vary in thickness and may be constructed in one or more pieces to accommodate a metered orifice. For example, such configuration may enable a user to manually push or rotate a portion of the orifice reducer to increase or decrease the dispensing opening to provide a desired metered dispense rate. Optionally (e.g. for liquids or powders), the dispensing opening may include an option for fixing a spout thereto, such as a movable cylindrical spout, which can be raised upward for pouring contents, after the tamper evident seal has been removed. Optionally, the injection molded orifice reducer may be recessed below the container opening to allow physical separation from the flexible seal. For any embodiment, the top surface of the orifice reducer may include a small flip top hinge to allow the user to re-seal the orifice after removing the foil. Such a re-closable orifice reducer may enhance the shelf-life of the product in the container. Optionally, more than one of the foregoing optional embodiments may be combined. For example, a flip top re-sealable lid may be permanently attached to the injection molded polymer orifice reducer dispensing opening, which can be resealed after the tamper evident flexible seal has been removed. Such re-sealable lid does not touch the tamper evident flexible seal during induction sealing or in-mold labeling, if the orifice reducer is recessed below the container opening.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

Figure 1:
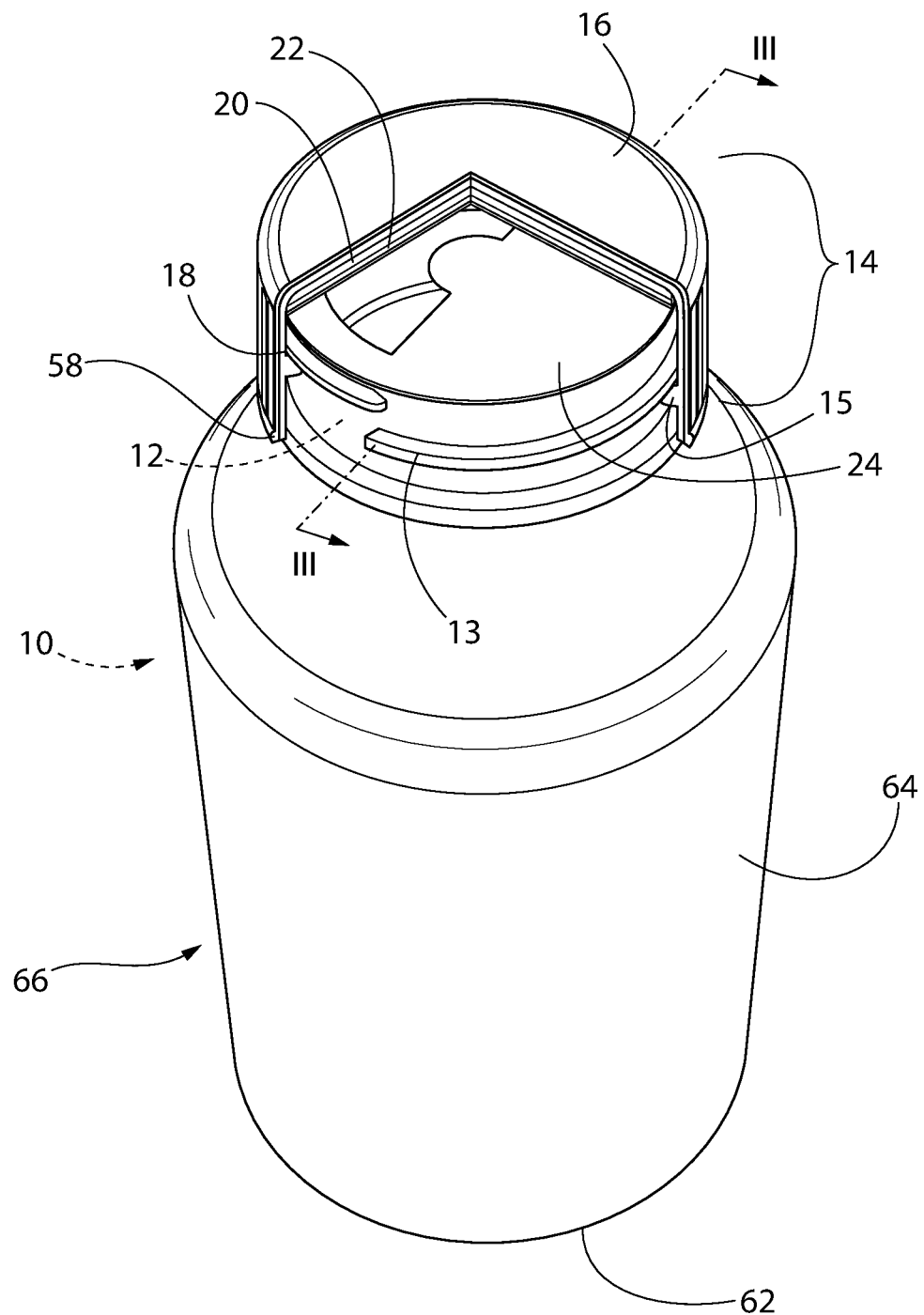
FIG. 1 is a partially cutaway perspective view of a container in the form of a bottle, with an exemplary closure comprising an orifice reducer according to an embodiment of the invention.
Figure 2:
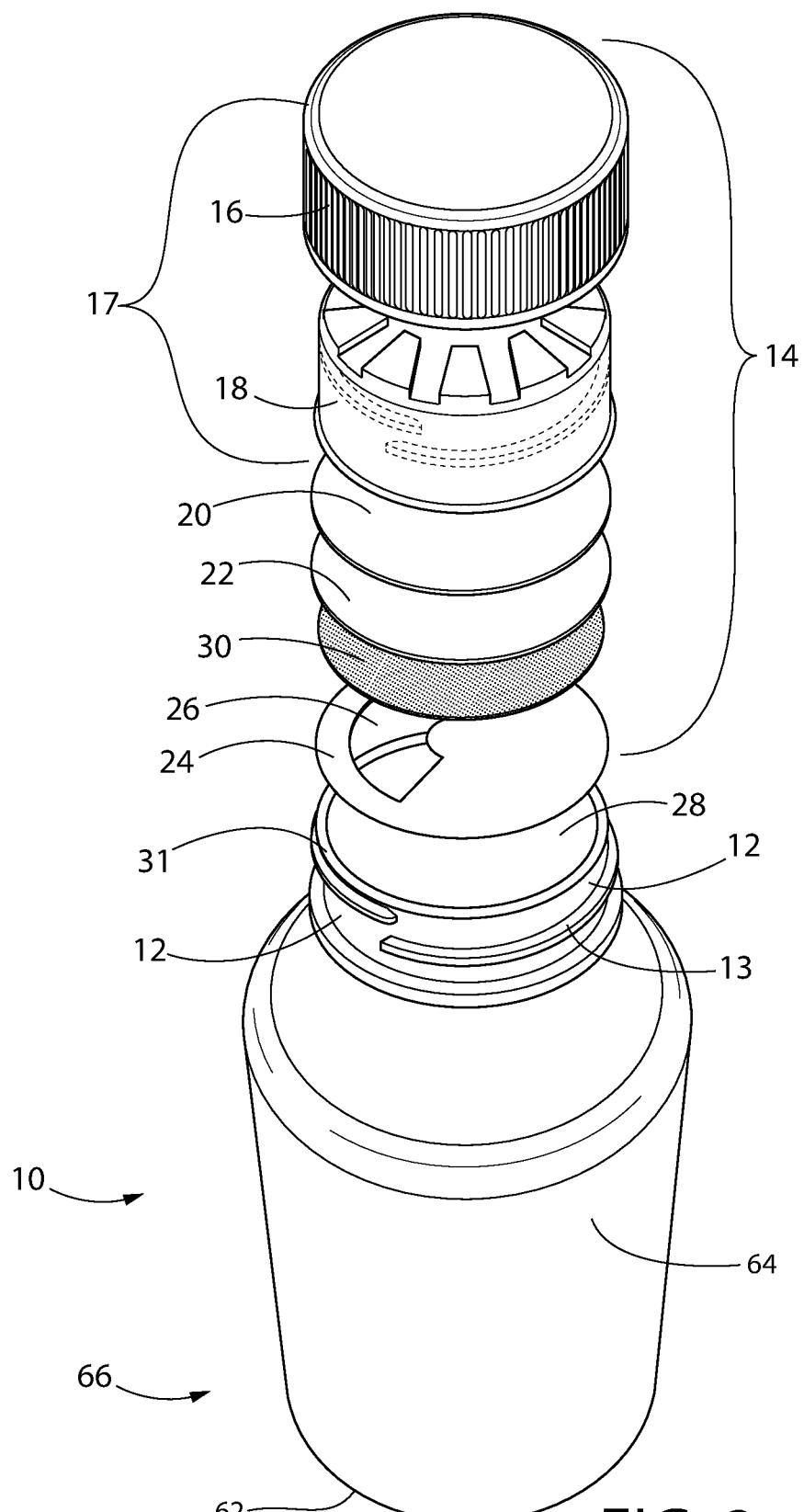
FIG. 2 is an exploded perspective view of the container of FIG. 1.
Figure 3:
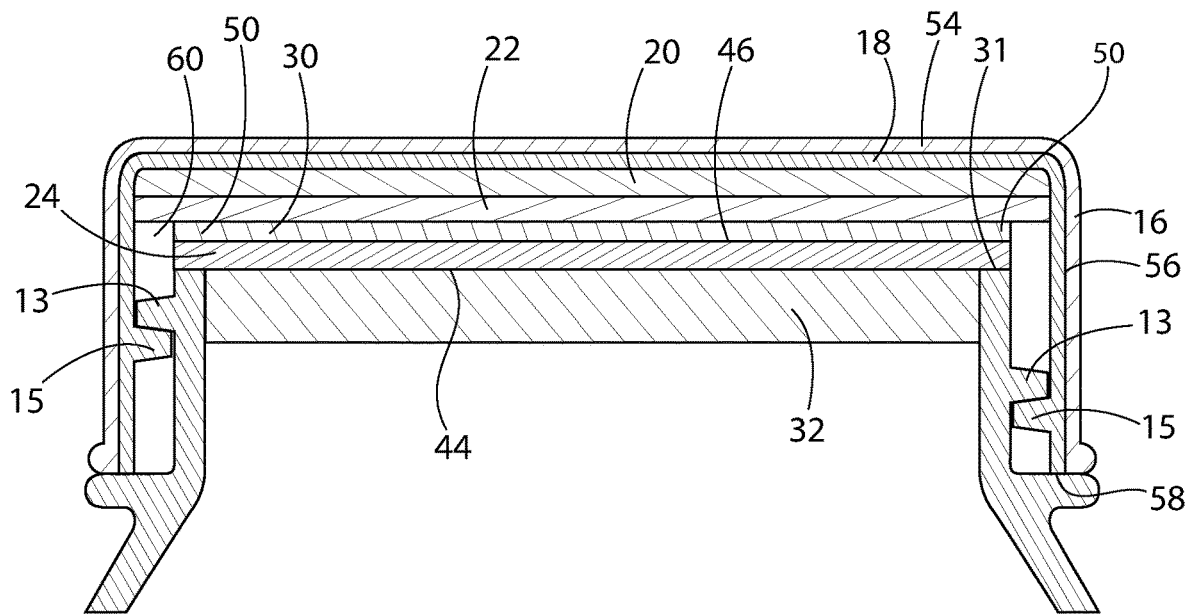
FIG. 3 is a cross-sectional view of a top section of the container taken along cutting plane III-III in FIG. 1, with the exemplary orifice reducer of FIG. 1.

Referring now in detail to the various figures of the drawings wherein like reference numerals refer to like parts, there is shown in FIGS. 1-3 various views of a container 10 in the form of a bottle, having an exemplary orifice reducer 24 permanently secured thereto. While the bottle is one contemplated type of container that may be used in conjunction with the present invention, other types of containers are also contemplated. It should be understood that where the term "bottle" is used to describe an exemplary embodiment, the broader, more generic term "container" may also be used in its place.

A container 10 according to an exemplary embodiment includes a body 66 having a base 62 and one or more sidewalls 64 extending from the base 62, leading to a rim 31 surrounding an opening 28 of the container. The embodiment shown is cylindrical and thus has a round, unitary sidewall 64. However, containers according to the invention may be other shapes, e.g., rectangular cuboid, and thus have more than a single continuous (e.g., round) sidewall. As shown, e.g., in FIG. 3A, the rim 31 surrounds the opening 28 and has a continuous annular upper engagement surface 40 extending from the opening 28 to an outer periphery 42 of the rim 31.

The orifice reducer 24 is a component of a closure 14. The closure 14 includes at least a removable (e.g., by peeling away) and/or puncturable flexible tamper evident seal 30 disposed over an orifice reducer 24. The closure 14 also preferably includes a cap that closes over and covers the aforementioned components (with or without additional interposed components). In the embodiment shown in FIGS. 1-3, the closure 14 optionally includes a removable cap assembly 17. The cap assembly 17 comprises an inner cap 18 secured within the underside of an outer cap 16, wherein the inner cap 18 cooperates with the outer cap 16 to prevent children from easily opening the container 10, thereby providing a child-resistant function or feature. The underside of the inner cap 18 includes internal threads 15, which engage external threads 13 on the neck 12 of the container 10, thus enabling the cap to be removably secured to the body 66 of the container 10.

In alternative optional embodiments, the cap may be single unit, e.g., the outer cap 16 alone, without the inner cap. The term "cap" by itself, as used herein, may refer to a single-piece cap, a cap assembly (e.g., 17), or both, depending on the context. Optionally, a cap according to the invention may be embodied as a screw top, flip top, a press-on snap-type engagement or press-fit type engagement, etc. Optionally, the cap, when closed on a container, provides a moisture tight seal between the cap and container.

Figure 3A:
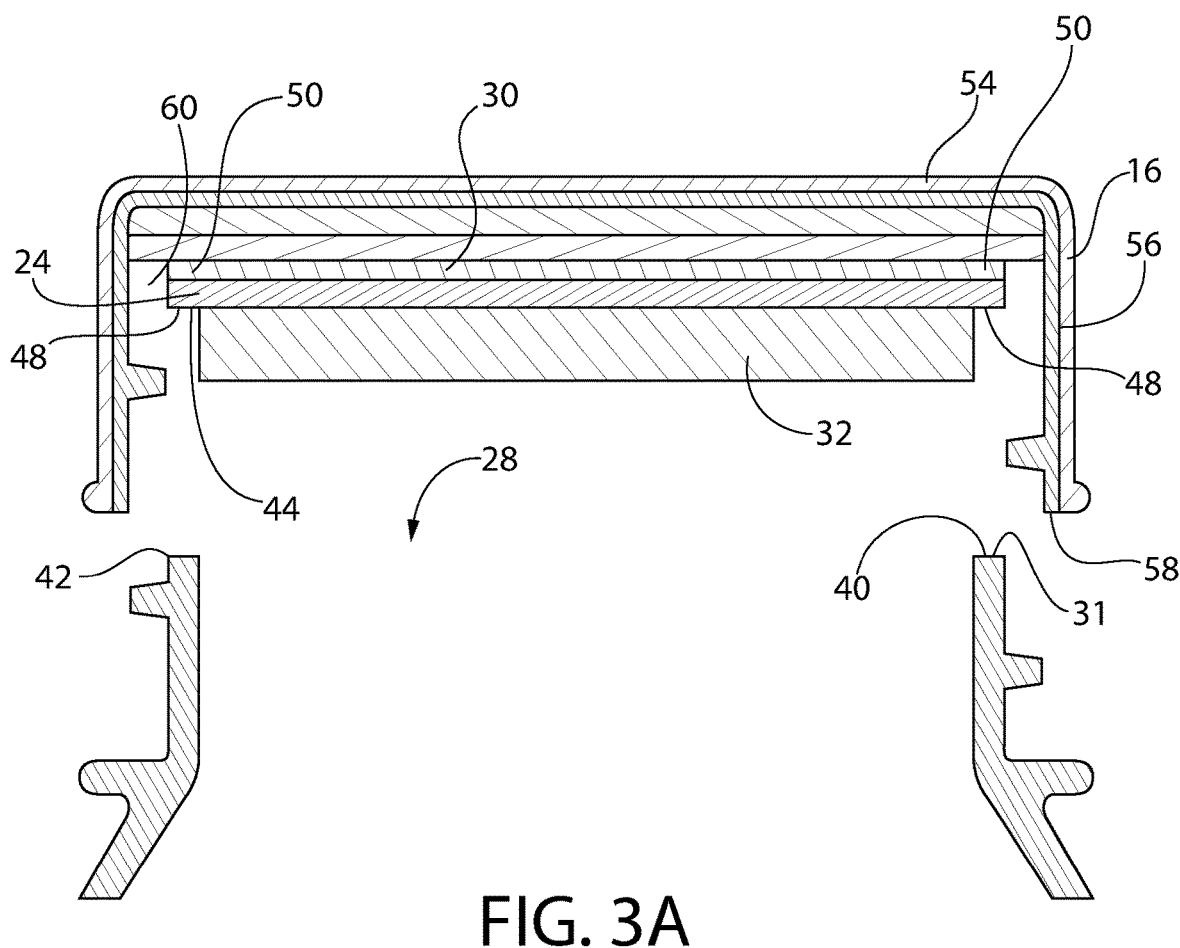
FIG. 3A is a cross-sectional view of a top section of the container taken along cutting plane III-III in FIG. 1, with the closure positioned above the body of the container.

As best seen in FIG. 3A, the cap assembly 17 comprises a top portion 54 with an annular skirt 56 depending downward therefrom and terminating at an annular boundary 58. The cap assembly 17 defines an interior space 60 within the skirt 56 of the cap assembly 17.

For certain uses, a child-resistant cap may be desired, but may not be necessary for all applications. Thus, child-resistant and non-child-resistant caps are contemplated. If a child-resistant feature is provided, e.g., such as provided by the cap assembly 17, the child-resistant feature optionally requires that force in more than one single direction is applied to the cap to remove the cap from the container. For example, the cap assembly 17 may require a user to press downward (first direction) before rotating the cap (second direction) in order to remove the cap from the container. Alternative child-resistant features, if desired, are also contemplated.

As shown, the closure 14 optionally includes a pulp backing 20, which engages the underside of the inner cap 18 and a wax layer 22, which abuts the pulp backing 20. Optionally, other layers as an alternative to wax are contemplated, which temporarily adhere the pulp backing to the foil.

A polymer orifice reducer 24 may be optionally formed, at least in part, from an injection molded thermoplastic resin. The orifice reducer 24 has an underside 44, a topside 46 and at least one pre-formed dispensing opening 26 providing passage from the underside 44 to the topside 46. The underside 44 has a downwardly facing annular engagement surface 48 which is disposed directly over the upper engagement surface 40 of the rim 31 of the container 10 and is permanently secured, e.g., adhered thereto. The orifice reducer 24 covers and obstructs at least a portion of the opening 28. The at least one dispensing opening 26 is smaller in area than the total area of the opening 28. The dispensing opening 26 may be customized in shape and size for its particular use, depending on the shape and size of the units contained within the container 10. The dispensing opening 26 facilitates ordered and simple dispensing of individual units or small numbers of units, e.g., medicinal or nutriceutical tablets or capsules held by the container 10. The dispensing opening 26 may alternatively facilitate ordered dispensing of small amounts of liquid or powders held by the container 10. For dispensing powders, granules or other very small solid units, the orifice reducer may have a single small dispensing opening or a plurality of single small dispensing openings (e.g., like a spice bottle).

The orifice reducer 24 is preferably made from an injection molded plastic, such as polyethylene or polypropylene, for example. Optionally, the orifice reducer 24 has a thickness of about 0.20 mm, which is thick enough to resist puncturing or damage through use as intended, yet may be slightly flexible (albeit less flexible than the flexible tamper evident seal 30). Alternatively, the orifice reducer is constructed to be semi-rigid or rigid, having a thickness of from 0.1 mm to 0.5 mm, or from 0.5 mm to 1 mm, or greater than 1 mm.

Figure 3B:
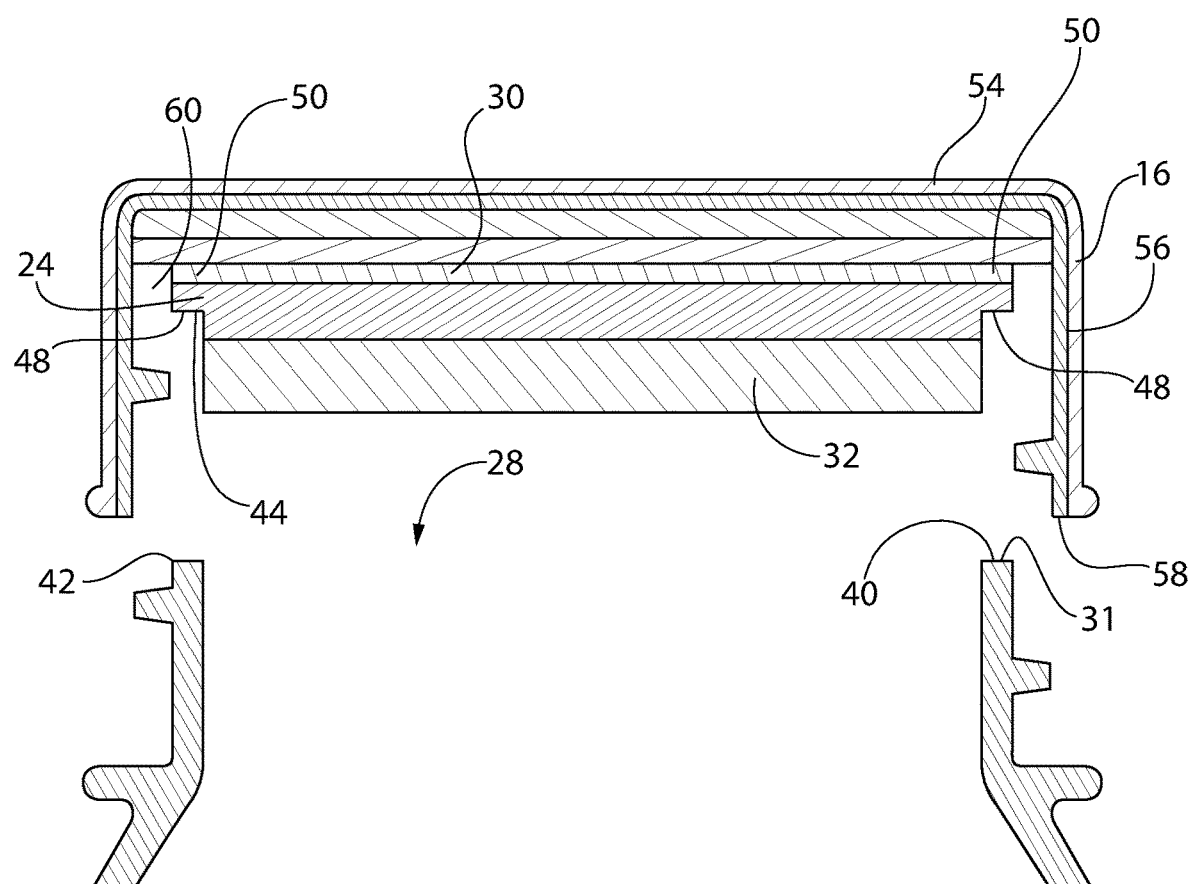
FIG. 3B is a cross-sectional view of a top section of the container taken along cutting plane III-III in FIG. 1, with an alternative embodiment of a closure positioned above the body of the container.

In one optional embodiment, the orifice reducer 24 has a uniform thickness. Alternatively, as shown in FIG. 3B, the orifice reducer 24 may have a first thickness and a second thickness. The first thickness, which is preferably substantially uniform, is located between the topside 46 and the downwardly facing annular engagement surface 48, directly below the topside 46. The first thickness is preferably from 0.1 mm to 0.5 mm, most preferably from 0.15 mm to 0.35 mm. The second thickness is a thickness of the orifice reducer 24 at any section thereof, located radially inward from the downwardly facing annular engagement surface 48. The second thickness may be uniform or may vary (i.e., include more than one thickness). The second thickness should be greater than the first thickness, so as to provide a desired level of rigidity of the orifice reducer. For example, the first thickness may be 0.25 mm while the second thickness may be 1 mm or 2 mm. When the orifice reducer 24 is disposed within the interior space 60 of the cap assembly 17, the second thickness (at its maximum) should not extend beyond the annular boundary 58 of the skirt 56.

If the second thickness were to extend beyond the outer boundary 58, that could compromise the process of assembling the closure 14 to the container body 66.

A flexible tamper evident seal 30, which preferably comprises foil but may include other flexible barrier materials or material composites (which provide a barrier to one or more atmospheric gases, e.g., oxygen or water vapor), is adhered to or otherwise secured to at least a portion of the orifice reducer 24. If the flexible tamper evident seal 30 comprises metallic foil, the foil in any embodiment may have a thickness of, e.g., 10 μm-100 μm, optionally 10 μm-80 μm, optionally 10 μm-60 μm, optionally 20 μm-50 μm, optionally 20 μm-30 μm. Again, the orifice reducer 24 may be rigid, semi-rigid or somewhat flexible, however it should be comparatively more rigid (less flexible) than the flexible tamper evident seal 30. Further, the flexible tamper evident seal 30 should be tamper evident, meaning that once it is removed (e.g., by peeling away) or punctured, it cannot be readily resealed, replaced or mended. An intact flexible tamper evident seal 30 thus ensures a user that the contents of the container have not been tampered with prior to the container coming into the user's custody. A flexible tamper evident seal 30 that has been compromised indicates to a user that the container had been previously opened.

If the closure 14 includes a cap assembly 17, the orifice reducer 24 and flexible tamper evident seal 30 are disposed within the interior space 60 of the cap assembly 17. No part of the orifice reducer 24 extends beyond the annular boundary 58 of the cap's annular skirt 56. Optionally, the orifice reducer 24 is press-fit into the interior space 60.

Figure 5:
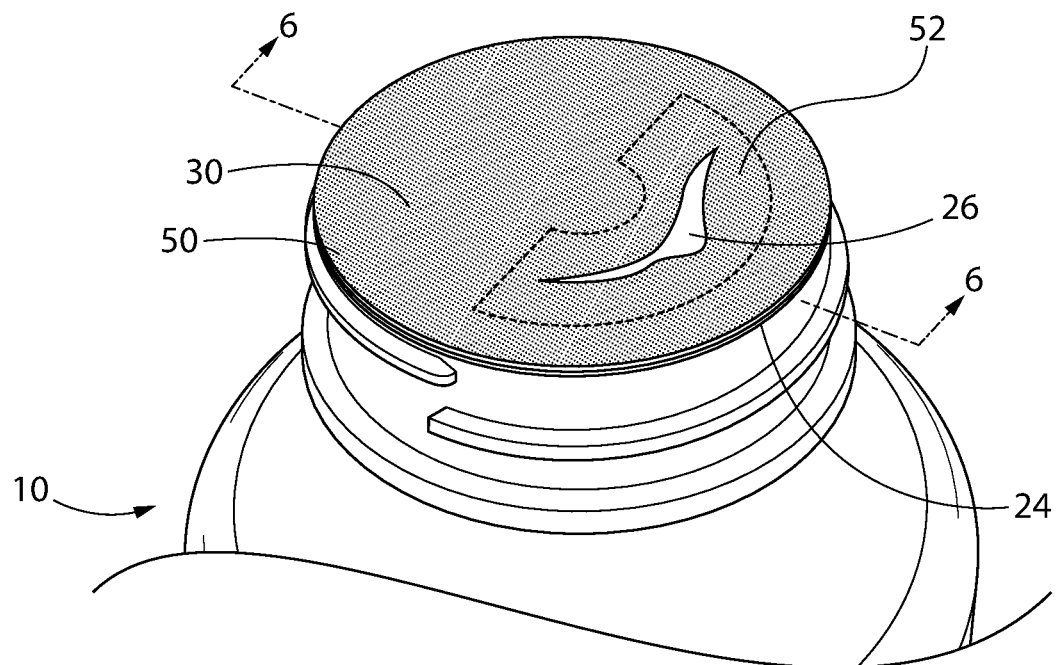
FIG. 5 shows a partial perspective view of an exemplary container with an orifice reducer having a flexible seal being removed therefrom.

FIG. 5 shows the container 10 with the orifice reducer 24 permanently secured to the rim of the container opening, with the flexible tamper evident seal 30 secured to and disposed over at least a part of the topside 46 of the orifice reducer 24. As shown, the flexible tamper evident seal 30 has been punctured over a section of the dispensing opening 26 of the orifice reducer 24, thus providing access to the dispensing opening 26, opening 28 and contents of the container 10. As an alternative to puncturing, it is contemplated that the flexible tamper evident seal 30 may be removed (e.g., peeled) from the dispensing opening 26. Optionally, the flexible tamper evident seal 30 includes a seam following the outline of the dispensing opening or located within the dispensing opening, which facilitates a user's removal of that portion of the flexible tamper evident seal 30 encompassed by the seam. Such removal may be achieved, e.g., by peeling away that portion of the flexible tamper evident seal 30 (e.g., with a pull tab), pushing in that portion of the flexible seal, cutting along the seam or puncturing that portion of the flexible tamper evident seal 30.

Figure 4A:
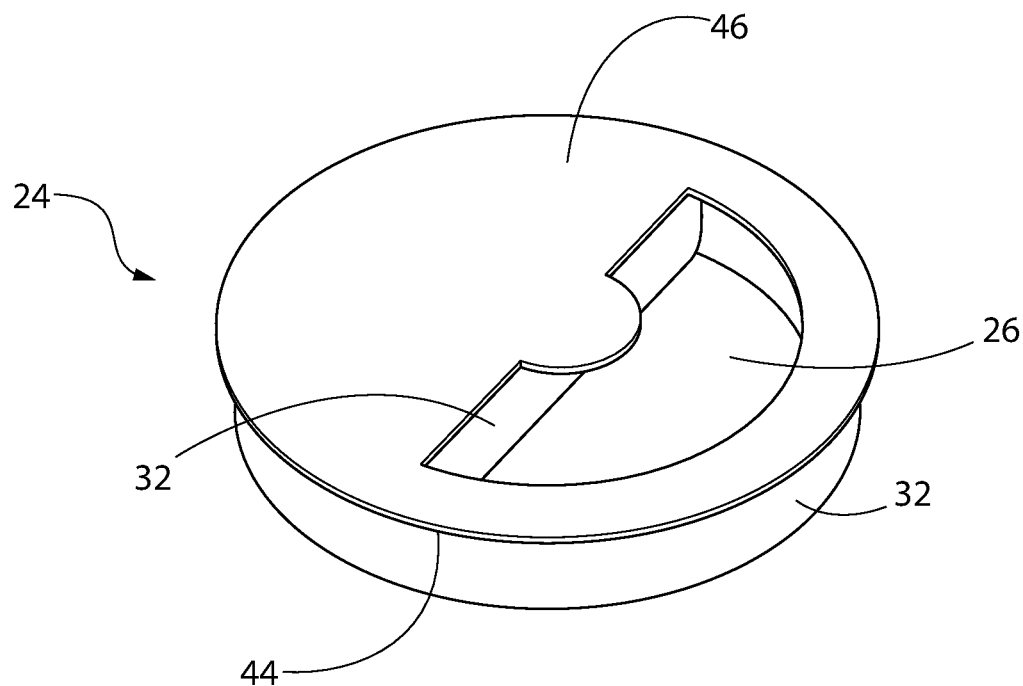
FIG. 4A is a perspective view of an exemplary orifice reducer having a desiccant polymer molded onto an underside thereof.
Figure 4B:
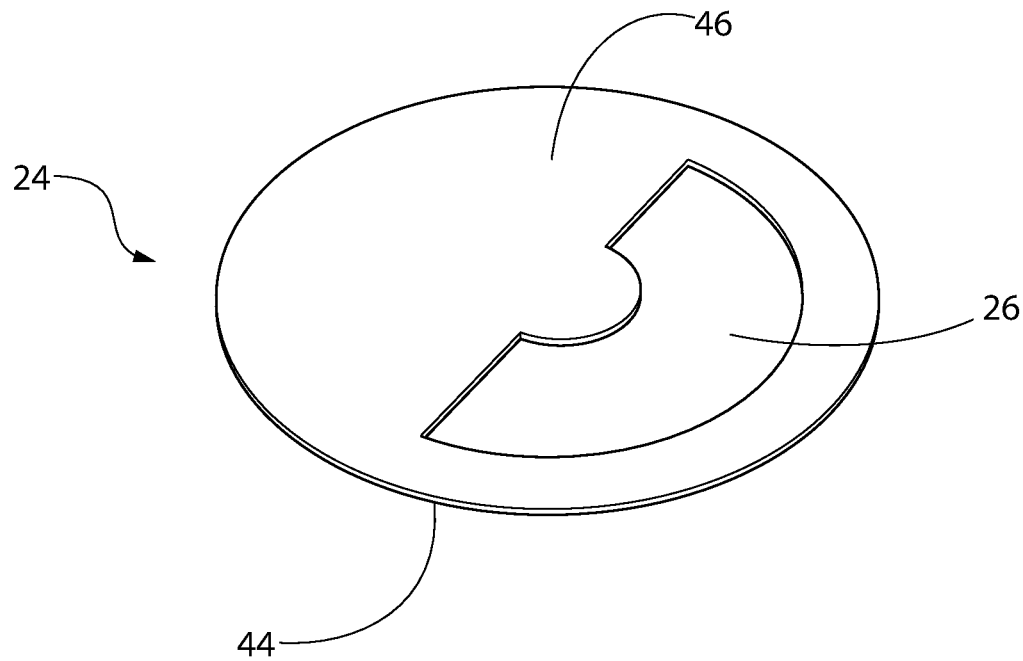
FIG. 4B is a perspective view of an exemplary orifice reducer that does not have a desiccant polymer on an underside thereof.
Figure 4C:
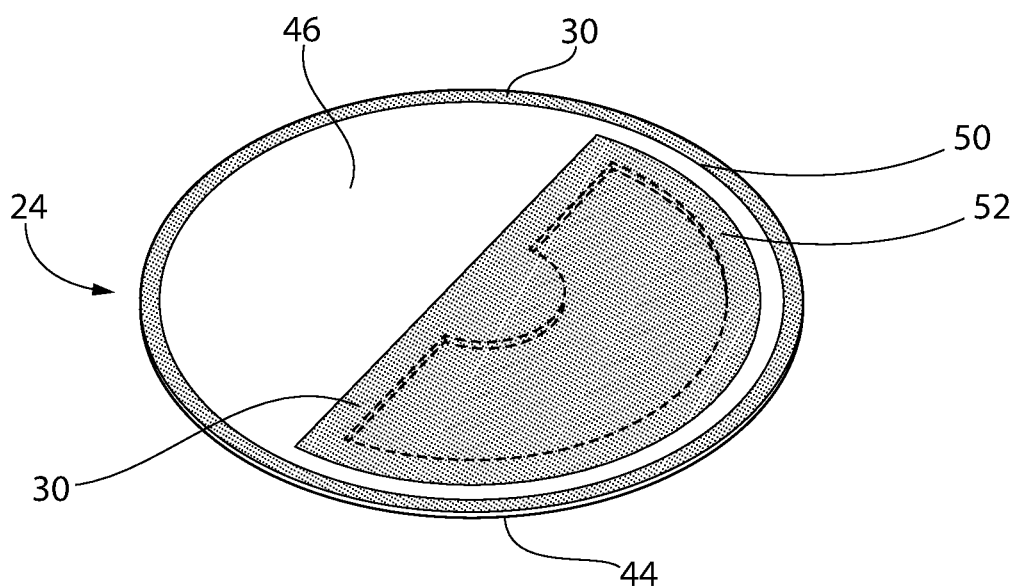
FIG. 4C is a perspective view of a closure according to an optional embodiment of the invention, comprising a flexible tamper evident seal disposed on the topside of an exemplary orifice reducer, wherein first and second seal sections of the tamper evident seal are not contiguous.

Optionally, as shown in FIGS. 3, 3A, 4C, 5 and 6, the flexible tamper evident seal 30 may include a first seal section 50 and a second seal section 52. The first seal section 50 is disposed over at least some area of the topside 46 of the orifice reducer 24 directly above the downwardly facing engagement surface 48. The second seal section 52 covers the dispensing opening and, as may be the case, other areas of the topside 46 of the orifice reducer 24 other than directly above the downwardly facing engagement surface 48. The first seal section 50 and second seal section 52 (which make up the flexible tamper evident seal 30) may be connected to and contiguous with each other, e.g., as shown in FIG. 5. Alternatively, the first seal section 50 and second seal section 52 of the flexible tamper evident seal 30 are not contiguous, e.g., as shown in FIG. 4C. In the embodiment in FIG. 4C, the first seal section 50 may optionally be left intact by a user while the second seal section 52 may be removed or punctured to access the dispensing opening 26. The first seal section 50 is preferably configured to cause the downwardly facing engagement surface 48 of the orifice reducer to be permanently secured, e.g., adhered, to the upper engagement surface 40 of the rim 31 of the container 10, as further explained below.

According to some embodiments, e.g., as shown in FIG. 4A, the orifice reducer 24 may include an active polymer component 32 that is affixed to or integral with at least a portion of the underside of the orifice reducer. The active polymer component 32 comprises a base polymer entrained with one or more active agents and thus may be referred to herein as a polymer entrained with an active agent or simply active polymer. The active agent in the active polymer component 32 may include an absorbing material, a releasing material and/or an activation material. A list of active agents includes, but is not limited to: desiccants, oxygen scavengers, odor absorbers, ethylene absorbers, CO2 absorbers, fragrance/aroma release, CO2 releasing materials, and/or nutrient releasing materials.

Examples of absorption material include, but are not limited to, one or more one or more desiccants. Examples of desiccants include molecular sieves, silica gels, clays (e.g. montmorillonite clay), certain synthetic polymers (e.g. those used in baby diapers), and starches.

In another embodiment, the absorbing materials may be either: (1) metals and alloys such as, but not limited to, nickel, copper, aluminum, silicon, solder, silver, gold; (2) metal-plated particulate such as silver-plated copper, silver-placed nickel, silver-plated glass microspheres; (3) inorganics such as BaTiO3, SrTiO3, SiO2, Al2O3, ZnO, TiO2, MnO, CuO, Sb2O3, WC, fused silica, filmed silica, amorphous fused silica, sol-gel silica, sol-gel titanates, mixed titanates, ion exchange resins, lithium-containing ceramics, hollow glass microspheres; (4) carbon-based materials such as carbon, activated charcoal, carbon black, ketchen black, diamond powder; and (5) elastomers, such as polybutadiene, polysiloxane, and semi-metals, ceramic. In another example, the absorbing material may be calcium oxide. In the presence of moisture and carbon dioxide, the calcium oxide is converted to calcium carbonate. Accordingly, calcium oxide may be used as the absorbing material in application where absorption of carbon dioxide is needed. A preferred polymer entrained with an active agent is a desiccant entrained polymer.

In yet another embodiment, the activation material may include a material that requires a specific liquid, vapor, or gas to activate the material and, after activation, the material releases the desired vapor, liquid, or gas.

In a further embodiment, the active polymer may be produced as two primary components (i.e., a two phase polymer)—a base polymer and an active agent. In another embodiment, the active polymer may be produced as at least three primary components (i.e., a three phase polymer). U.S. Pat. Nos. 5,911,937, 6,214,255, 6,130,263, 6,080,350 and 6,174,952, 6,124,006, and 6,221,446, which are incorporated by reference herein in their entireties, describe three phase entrained polymers and methods for making the same. For example, a three phase desiccant polymer may include a base polymer (e.g., polypropylene, polyethylene or mixtures thereof), a desiccant material (e.g., molecular sieve or silica gel) and a channeling agent (e.g., ethylene-vinyl alcohol (EVOH) and polyvinyl alcohol (PVOH)). The channeling agent may form passages in the three phase polymer through which moisture is communicable to desiccating agent entrained within the polymer.

Optionally, the active polymer component 32 is affixed to the underside of the orifice reducer 24, e.g., via press-fit or adhesives. Alternatively, the active polymer component 32 is injection molded to the underside of the orifice reducer 24 in a multi-shot molding process. In other words, the orifice reducer 24 may be formed in a mold from a first shot of injected polymer material and the active polymer component 32 may be formed in a mold from a second shot of injected active polymer material that abuts the orifice reducer 24, resulting in an orifice reducer 24 having an active polymer component 32 molded to, and thus integral with, the underside of the orifice reducer 24. The thickness and shape of the active polymer component 32 may vary, depending on the application. In the exemplary embodiment shown in the figures, the active polymer component 32 is thicker than the orifice reducer 24, extending around the periphery of the orifice reducer 24 and the dispensing opening 26. Optionally, the active polymer component 32 occupies some, substantially all, or the entire underside of the orifice reducer 24, other than over the dispensing opening; the active polymer component 32 should not obstruct the dispensing opening 26.

Optionally, as shown in FIG. 4B, the orifice reducer 24 does not have an active polymer component integral therewith or affixed thereto.

In one optional aspect, the invention is directed to the closure 14 itself. The closure 14 includes the cap assembly 17, having a top portion 54 with an annular skirt 56 depending downward from the top portion 54 and terminating at an annular boundary 58. The cap assembly 17 defines an interior space 60 within the skirt 56 of the cap assembly 17. The closure further includes a polymer orifice reducer 24, optionally made from an injection molded thermoplastic resin. The orifice reducer 24 is configured to be disposed over a rim and opening of a container, e.g., 10. The orifice reducer 24 has an underside 44, a topside 46 and at least one pre-formed dispensing opening 26 providing passage from the underside 44 to the topside 46. The underside 44 includes a downwardly facing annular engagement surface 48 configured to be disposed over an upper engagement surface (e.g., 40) of the rim (e.g., 31) and permanently secured thereto. The orifice reducer 24 is disposed, e.g., by press-fitting, within the interior space 60 of the cap assembly 17 with the topside 46 of the orifice reducer 24 facing the top portion 54 of the cap assembly 17. No part of the orifice reducer 24 extends beyond the annular boundary 58 of the cap assembly 17. The closure 14 further includes a flexible, tamper evident seal 30 disposed over at least part of the topside 46 of the orifice reducer 24. The flexible tamper evident seal 30 includes a first seal section 50 and a second seal section 52. The first seal section 50 is disposed over at least some area of the topside 46 of the orifice reducer 24 directly above the downwardly facing engagement surface 48. The second seal section 52 covers the at least one dispensing opening 26. The flexible tamper evident seal 30 is more flexible than the orifice reducer 24. The second seal section 52 is configured to be removed at least in part from the at least one dispensing opening 26 and/or punctured through to provide access to the at least one dispensing opening 26. The first seal section 50 comprises a material (optionally, foil) configured to be heated during an induction sealing process so as to cause the downwardly facing engagement surface 48 of the orifice reducer 24 to melt and then harden. This would thus configure the engagement surface 48 of the orifice reducer 24 to permanently adhere to the upper engagement surface 40 of the rim 31 of the container body 66. Optionally, the first seal section 50 does not extend radially beyond the topside 46 of the orifice reducer 24.

In an optional aspect, the invention is directed to a process for making a closure according to the invention, e.g., closure 14. The process includes the steps of: (a) providing the polymer orifice reducer 24 with the flexible tamper evident seal 30 secured to the topside 46 of the orifice reducer 24, wherein the flexible temper evident seal 30 had been previously secured to the topside 46 of the orifice reducer by in-mold labeling and/or induction sealing; and (b) after step (a), press-fitting the orifice reducer 24 into the interior space 60 of the cap assembly 17.

An alternative process for making the closure, e.g., 14, may include the following steps: (aa) providing the polymer orifice reducer 24 with the flexible tamper evident seal 30 disposed over but not initially secured to the topside 46 of the orifice reducer 24; (bb) after step (aa), press-fitting the orifice reducer 24 into the interior space 60 of the cap; and (cc) subjecting the closure 14 to induction sealing to permanently secure the flexible tamper evident seal 30 to the topside 46 of the orifice reducer 24. Optionally, after steps (aa) and (bb) are carried out, the process may further comprise the following steps: (dd) providing a container 10 comprising a body 66 having a base 61 and one or more sidewalls 64 extending from the base 62 and leading to a rim 31 surrounding an opening 28 of the container 10, the rim having a continuous annular upper engagement surface 40 extending from the opening 28 to an outer periphery 42 of the rim 31; and (ee) placing the closure 24 over the rim 31 and opening 28 of the container 10 so that the downwardly facing annular engagement surface 48 is disposed over the upper engagement surface 40 of the rim 31. According to the aforementioned process, step (cc) is carried out only after step (ee), such that subjecting the closure 14 to induction sealing also permanently adheres the downwardly facing engagement surface 48 of the orifice reducer 24 to the upper engagement surface 40 of the rim 31 of the container 10.

Various methods may be used to permanently secure the orifice reducer 24 to the body 66 of the container 10. A preferred method of so doing is by induction sealing, as discussed above. The process of induction sealing is described above in the Background section and that description is incorporated by reference here. In brief, induction sealing utilizes electromagnetic energy (e.g., produced by radio waves) to generate heat in metallic component(s). The heat causes polymers or other materials in contact with or near the metallic component(s) to melt and then solidify. This process of melting and solidification causes polymers in contact with or near the metallic component(s) to permanently adhere to each other or to adjacent surfaces. For example, use of induction sealing, where the flexible tamper evident seal 30 comprises foil, would cause the foil to heat, melting adjoining or nearby polymer components, after which such components would solidify.

The orifice reducer 24 should have a small thickness (e.g., under 1 mm) around the periphery thereof (between the downwardly facing engagement surface 48 and the topside 46). This small thickness enables the downwardly facing engagement surface 48 to melt when the first seal section 50 (which is above and near, but not in direct contact with, the downwardly facing engagement surface 48) is sufficiently heated. This in turn would cause the orifice reducer 24 to melt and then solidify to an extent that it causes the orifice reducer 24 to permanently adhere to the rim 31 of the opening 28 of the container 10. The process would also have the effect of adhering the flexible tamper evident seal 30 to the topside of the orifice reducer 24. Alternatively, an in-mold labeling injection molding process may cause the flexible tamper evident seal 30 (e.g., foil) to permanently adhere to the orifice reducer. The optional wax layer 22 (or non-wax alternative) and pulp backing 20 interposed between the optional inner cap 18 and flexible tamper evident seal 30 prevent the flexible tamper evident seal 30 from adhering to the inner cap 18 when performing induction sealing.

Preferably, the container 10 is prefilled with contents prior to permanently securing the orifice reducer 24 (with flexible tamper evident seal 30 thereon) to the container 10 about the opening 28. Optionally, the contents of the container may include: (a) a plurality of medicinal or nutraceutical tablets, capsules, gel caps, granules or pills; or (b) medicinal or nutraceutical powder or liquid; or (c) industrial or cleaning chemicals in the form of tablets, granules, powder or liquid; or (d) comestibles in the form of powder, liquid or a plurality of solid units.

Figure 6:
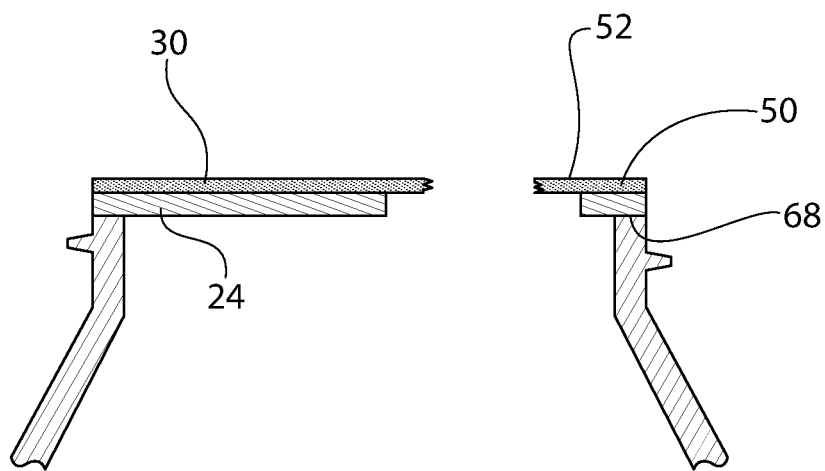
FIG. 6 is a sectional view taken along cutting plane line 6-6 in FIG. 5.

As mentioned above, the first seal section 50 is preferably configured to cause the downwardly facing engagement surface 48 of the orifice reducer to be permanently secured, e.g., adhered, to the upper engagement surface 40 of the rim 31 of the container 10. Optionally, the downward facing engagement surface 48 is permanently adhered to the upper engagement surface 40 of the container 10 by heating at least some of the first seal section 50 to an extent that it causes the downwardly facing engagement surface 48 to melt. A preferred method of accomplishing this is through induction sealing, as discussed above. Once the melted engagement surface 48 cools, it hardens sufficiently to permanently adhere the orifice reducer 24 to the upper engagement surface 40 of the rim 31. In other words, as shown in FIG. 6, a heat seal 68 is provided between the downwardly facing annular engagement surface 48 of the orifice reducer 24 and the upper engagement surface 40 of the rim 31 to permanently adhere the orifice reducer 24 to the body 66 of the container 10. Preferably, the downwardly facing annular engagement surface 48 is permanently adhered to the upper engagement surface 40 of the rim 31 solely via the heat seal 68, without a separate adhesive material there between. This provides an advantage, as adhesive materials often contain solvents, which may degrade or contaminate contents of the container 10.

Uniquely, this permanent adhering may be achieved without the flexible tamper evident seal 30 directly contacting the upper engagement surface 40 of the rim 31 of the container 10. In other words, in a preferred embodiment, the flexible tamper evident seal 30 does not permanently adhere to, or otherwise form a heat seal with, any portion of the body 66 of the container. Rather, the invention relies on using the flexible tamper evident seal 30 (the first section thereof) as a heating element to cause the orifice reducer 24 to be permanently secured to the rim 31 without the flexible tamper evident seal 30 itself being secured to the rim 31. Optionally, the downwardly facing annular engagement surface 48 is configured to be disposed over and secured to the entire upper engagement surface 40 of the rim 31. Optionally, the flexible tamper evident seal 30 is secured to at least a portion of the topside 46 of the orifice reducer 24 by induction sealing or by in-mold labeling during an injection molding process.

Preferably, aside from permanently securing the downwardly facing annular engagement surface 48 to the upper engagement surface 40 of the rim 31, there is no other structure or means permanently securing the orifice reducer 24 to the body 66 of the container 10. For example, the closure preferably does not include: (a) a downward projecting skirt adapted to be secured, optionally by snap fit, interference fit or by threaded engagement, to an outer portion of the rim and/or a neck of the container; and/or (b) a downward projecting stopper adapted to be secured, optionally by snap fit, interference fit, or by threaded engagement, to an inner portion of the rim and/or the neck of the container. This simplifies the assembly process of permanently securing the orifice reducer 24 onto the container body 66, in that the orifice reducer 24 need not be press fit into, screwed in, snapped onto, etc., the container body 66.

In one aspect, the invention is directed to a process for filling and sealing a container. The process comprises providing a container comprising a body having a base and one or more sidewalls extending from the base and leading to an opening. The process further comprises filling the container with contents through the opening, wherein such contents are optionally a plurality of medicinal or nutraceutical tablets or capsules, or solid or liquid product forms in the food, pharmaceutical or chemical industries. After filling the container with contents, the process further includes permanently securing an injection molded polymer orifice reducer about the opening of the container and covering at least a portion of the opening of the body, the orifice reducer having an underside and a topside and at least one dispensing opening providing passage from the underside to the topside and providing access to the opening of the body, the at least one dispensing opening being of lesser area than the opening of the body. The process further comprises providing a flexible, tamper evident seal resting atop and/or secured to at least a portion of the topside of the orifice reducer and covering the at least one dispensing opening, wherein the seal is more flexible than the orifice reducer, the seal being adapted to be removed (e.g., by peeling) at least in part from the at least one dispensing opening and/or punctured through, to provide access to the at least one dispensing opening. The foregoing process enables one to achieve a pre-filled container with a permanent orifice reducer and tamper evident seal in a relatively inexpensive and easy way. This process uniquely and advantageously does not require use of a skirt projecting from the orifice reducer, which skirt is adapted to be secured to an inner or outer portion of a rim of the opening of a container. This process also advantageously does not require achieving tolerances needed for press-fitting the orifice reducer into the container opening.

Figure 7:
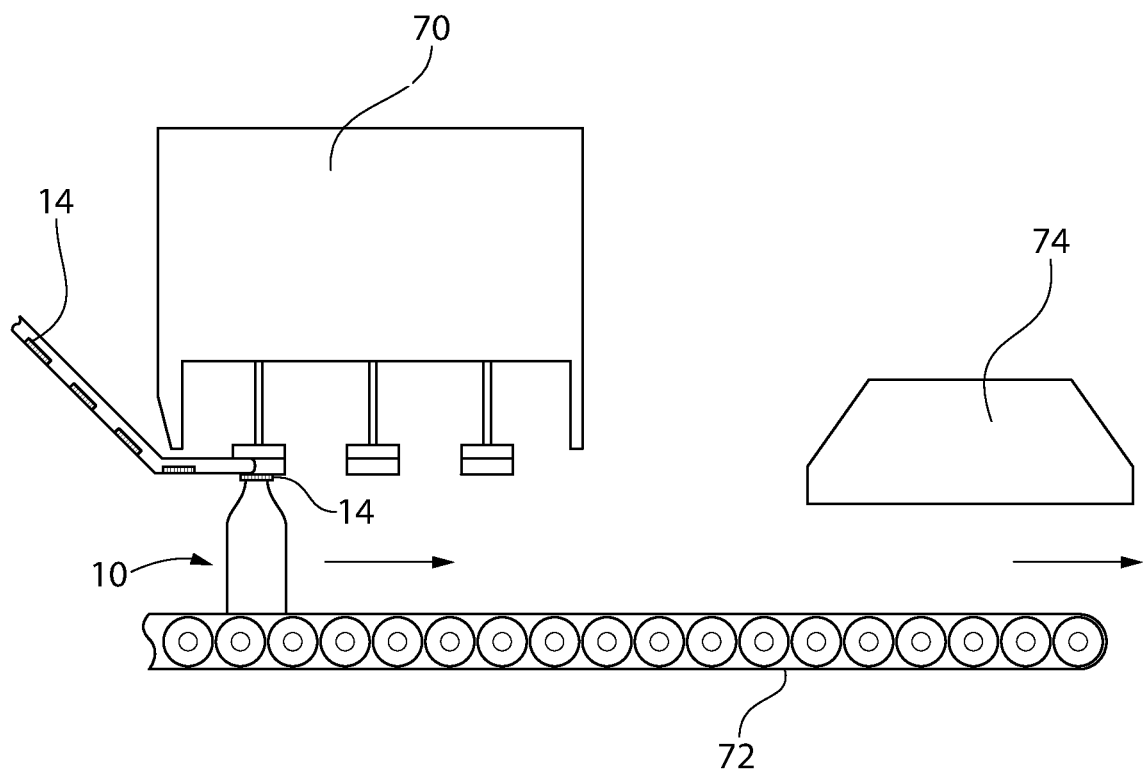
FIG. 7 is a schematic view of equipment that may be used in a process for sealing a container as part of a process for filling and sealing the container according to an optional embodiment.

In an optional aspect, the invention is directed to a process for filling and sealing the container 10. The process includes the following steps: (a) providing a container 10 comprising a body 66 having a base 62 and one or more sidewalls 64 extending from the base 62 and leading to a rim 31 surrounding an opening 28 of the container 10, the rim 31 having a continuous annular upper engagement surface 40 extending from the opening 28 to an outer periphery 42 of the rim 31; (b) filling the container with contents through the opening 28; (c) after step (b), placing the closure 14 over the rim 31 and opening 28 of the container so that the downwardly facing annular engagement surface 48 is disposed over the upper engagement surface 40 of the rim 31; and (d) after step (c), forming a heat seal 68 between the downwardly facing annular engagement surface 48 of the orifice reducer 24 and the upper engagement surface 40 of the rim 31 to permanently adhere the orifice reducer 24 to the container 10. Optionally, the heat seal 68 is formed by heating at least some of the first seal section 50, e.g., by induction sealing, thereby causing the downwardly facing engagement surface 48 to melt and then harden sufficiently to permanently adhere the orifice reducer 24 to the upper engagement surface 40 of the rim 31. Referring to FIG. 7, step (c) of the foregoing process may be performed by a capping machine 70, whereafter the container 10 is transferred, optionally by a conveyor 72, to an induction sealer 74 which performs step (d). With this process, the flexible tamper evident seal 30 optionally does not directly contact the upper engagement surface 40 of the rim 31 of the container 10.

Optionally, the orifice reducer includes at least one dispensing opening. Thus, in some embodiments, an orifice reducer may have two or more dispensing openings.

While the invention has been described in detail and with reference to specific examples thereof, it will be apparent to one skilled in the art that various changes and modifications can be made therein without departing from the spirit and scope thereof.

What is claimed is:

1. A process for filling and sealing a container, the process comprising the steps of:
    a. providing the container comprising a body having a base and one or more sidewalls extending from the base and leading to a rim surrounding an opening of the container, the rim having a continuous annular upper engagement surface extending from the opening to an outer periphery of the rim;
    b. filling the container with contents through the opening;
    c. providing a closure, the closure comprising a polymer orifice reducer, the orifice reducer having an underside, a topside, and at least one pre-formed dispensing opening providing passage from the underside to the topside, the underside including a downwardly facing annular engagement surface configured to be disposed over the upper engagement surface of the rim and permanently secured thereto, the orifice reducer being an injection molded piece having a first thickness and a second thickness, the first thickness being between the topside and the downwardly facing annular engagement surface directly below the topside, the second thickness being between the topside and the underside at a location radially inward from the downwardly facing annular engagement surface, the second thickness being greater than the first thickness, the closure further comprising a flexible, tamper evident seal disposed over at least a part of the topside of the orifice reducer, the flexible, tamper evident seal including a first seal section and a second seal section, the first seal section being disposed over at least some area of the topside of the orifice reducer directly above the downwardly facing annular engagement surface, the second seal section covering the at least one pre-formed dispensing opening, wherein the flexible, tamper evident seal is more flexible than the orifice reducer, the second seal section being configured to be removed at least in part from the at least one pre-formed dispensing opening and/or punctured through to provide access to the at least one pre-formed dispensing opening, the process further comprising, after step (b), placing the closure over the rim and opening of the container so that the downwardly facing annular engagement surface is disposed over the upper engagement surface of the rim; and
    d. after step (c), heating at least some of the first seal section so as to form a heat seal, upon cooling, between the downwardly facing annular engagement surface of the orifice reducer and the upper engagement surface of the rim to permanently adhere the orifice reducer to the container.

2. The process of claim 1, wherein heating at least some of the first seal section causes the downwardly facing engagement surface to melt and, upon cooling, to then harden sufficiently to form the heat seal.

3. The process of claim 1, wherein the heat seal is formed by subjecting the closure and container, when assembled, to induction sealing.

4. The process of claim 1, wherein the downwardly facing annular engagement surface of the orifice reducer is permanently adhered to the upper engagement surface of the rim without a separate adhesive material therebetween.

5. The process of claim 1, wherein the closure, aside from a cap if the closure includes the cap, does not include:
    a. a downward projecting skirt secured by snap fit, interference fit or by threaded engagement, to an outer portion of the rim and/or a neck of the container; and/or
    b. a downward projecting stopper secured by snap fit, interference fit, or by threaded engagement, to an inner portion of the rim and/or the neck of the container.

6. The process of claim 1, wherein the flexible, tamper evident seal does not directly contact the upper engagement surface of the rim of the container.

7. The process of claim 1, the closure further comprising a cap having a top portion with an annular skirt depending downward from the top portion and terminating at an annular boundary, the cap defining an interior space within the skirt of the cap, the orifice reducer being disposed within the interior space of the cap with the topside of the orifice reducer facing the top portion of the cap, wherein no part of the orifice reducer extends beyond the annular boundary of the cap, wherein step (c) is performed by a capping machine, whereafter the container is transferred to an induction sealer which performs step (d).

8. The process of claim 1, wherein the heat seal is the sole means for permanently securing the orifice reducer to the container.

9. The process of claim 1, wherein the first thickness is from 0.1 mm to 1.0 mm.

10. The process of claim 1, wherein the tamper evident seal comprises a foil.

11. The process of claim 1, wherein the flexible, tamper evident seal is secured to at least a portion of the topside of the orifice reducer by in mold labeling.

12. The process of claim 1, wherein the closure further comprises a polymer entrained with an active agent that is affixed to or integral with at least a portion of the underside of the orifice reducer.

13. The process of claim 12, wherein the polymer entrained with the active agent is injection molded onto the underside of the orifice reducer, the active agent comprising a desiccant.

14. The process of claim 1, wherein the heat seal is formed by heating at least some of the first seal section, thereby causing the downwardly facing engagement surface to melt and, upon cooling, to then harden sufficiently to permanently adhere the orifice reducer to the upper engagement surface of the rim, the downwardly facing annular engagement surface of the orifice reducer being permanently adhered to the upper engagement surface of the rim without a separate adhesive material therebetween, wherein the closure further comprises a polymer entrained with an active agent that is affixed to or integral with at least a portion of the underside of the orifice reducer, the first thickness being from 0.1 mm to 1.0 mm.

15. A process for making a closure for a container, the closure including an assembly comprising a polymer orifice reducer, a flexible tamper evident seal and a cap, the process comprising the steps of:
- a. providing the polymer orifice reducer with the flexible tamper evident seal disposed over at least part of a topside of the orifice reducer, the orifice reducer being configured to be disposed over a rim and opening of a container, the orifice reducer having an underside, the topside and at least one pre-formed dispensing opening providing passage from the underside to the topside, the underside including a downwardly facing annular engagement surface configured to be disposed over an upper engagement surface of the rim and permanently secured thereto the orifice reducer being an injection molded piece having a first thickness and a second thickness, the first thickness being between the topside and the downwardly facing annular engagement surface directly below the topside, the second thickness being between the topside and the underside at a location radially inward from the downwardly facing annular engagement surface, the second thickness being greater than the first thickness, the flexible tamper evident seal including a first seal section and a second seal section, the first seal section being disposed over at least some area of the topside of the orifice reducer directly above the downwardly facing engagement surface, the second seal section covering the at least one pre-formed dispensing opening, wherein the flexible tamper evident seal is more flexible than the orifice reducer, the second seal section being configured to be removed at least in part from the at least one pre-formed dispensing opening and/or punctured through to provide access to the at least one pre-formed dispensing opening, the first seal section comprising a material configured to be heated during induction sealing so as to cause the engagement surface of the orifice reducer to melt and, upon cooling, to then harden so that the engagement surface of the orifice reducer would permanently adhere to the upper engagement surface of the rim of the container, the flexible tamper evident seal having been previously secured to the topside of the orifice reducer; and
- b. after step (a), press-fitting the orifice reducer into an interior space of the cap, the cap having a top portion with an annular skirt depending downward from the top portion and terminating at an annular boundary, the cap defining the interior space within the skirt of the cap.

16. The process of claim 15, wherein no part of the orifice reducer extends beyond the annular boundary.

17. The process of claim 16, wherein the closure further comprises a polymer entrained with an active agent that is affixed to or integral with at least a portion of the underside of the orifice reducer.

18. A process for making a closure for a container, the closure including an assembly comprising a polymer orifice reducer, a flexible tamper evident seal and a cap, the process comprising the steps of:
- a. providing the polymer orifice reducer with the flexible tamper evident seal disposed over, but not initially secured to, at least part of a topside of the orifice reducer, the orifice reducer configured to be disposed over a rim and opening of a container, the orifice reducer having an underside, the topside and at least one pre-formed dispensing opening providing passage from the underside to the topside, the underside including a downwardly facing annular engagement surface configured to be disposed over an upper engagement surface of the rim and permanently secured thereto the orifice reducer being an injection molded piece having a first thickness and a second thickness, the first thickness being between the topside and the downwardly facing annular engagement surface directly below the topside, the second thickness being between the topside and the underside at a location radially inward from the downwardly facing annular engagement surface, the second thickness being greater than the first thickness, the flexible tamper evident seal including a first seal section and a second seal section, the first seal section being disposed over at least some area of the topside of the orifice reducer directly above the downwardly facing engagement surface, the second seal section covering the at least one pre-formed dispensing opening, wherein the flexible tamper evident seal is more flexible than the orifice reducer, the second seal section being configured to be removed at least in part from the at least one pre-formed dispensing opening and/or punctured through to provide access to the at least one pre-formed dispensing opening, the first seal section comprising a material configured to be heated during induction sealing so as to cause the engagement surface of the orifice reducer to melt and, upon cooling, to then harden so that the engagement surface of the orifice reducer would permanently adhere to the upper engagement surface of the rim of the container;
- b. after step (a), press-fitting the orifice reducer into an interior space of the cap, the cap having a top portion with an annular skirt depending downward from the top portion and terminating at an annular boundary, the cap defining the interior space within the skirt of the cap, wherein the assembled orifice reducer, flexible tamper evident seal and cap form the closure; and
- c. subjecting the closure to heat sealing by heating the first seal section to permanently secure the flexible tamper evident seal to the topside of the orifice reduce upon cooling.

19. The process of claim 18, wherein no part of the orifice reducer extends beyond the annular boundary.

20. The process of claim 19, wherein the closure further comprises a polymer entrained with an active agent that is affixed to or integral with at least a portion of the underside of the orifice reducer.

21. A process for assembling a closure onto a container, the process comprising:
- aa. providing the closure made according to the process of claim 18;
- bb. providing a container body having a base and one or more sidewalls extending from the base and leading to a rim surrounding an opening of the container body, the rim having a continuous annular upper engagement surface extending from the opening to an outer periphery of the rim; and
- cc. placing the closure over the rim and opening of the container body so that the downwardly facing annular engagement surface is disposed over the upper engagement surface of the rim, wherein subjecting the closure to heat sealing after step (cc) permanently adheres the downwardly facing engagement surface of the orifice reducer to the upper engagement surface of the rim of the container body upon cooling.

22. A process for assembling a closure onto a container, the process comprising:
- aa. providing the closure made according to the process of claim 20;

bb. providing a container body having a base and one or more sidewalls extending from the base and leading to a rim surrounding an opening of the container body, the rim having a continuous annular upper engagement surface extending from the opening to an outer periphery of the rim; and cc. placing the closure over the rim and opening of the container body so that the downwardly facing annular engagement surface is disposed over the upper engagement surface of the rim, wherein subjecting the closure to heat sealing after step (cc) permanently adheres the downwardly facing engagement surface of the orifice reducer to the upper engagement surface of the rim of the container body upon cooling.

* * * * *